Patented Jan. 10, 1933

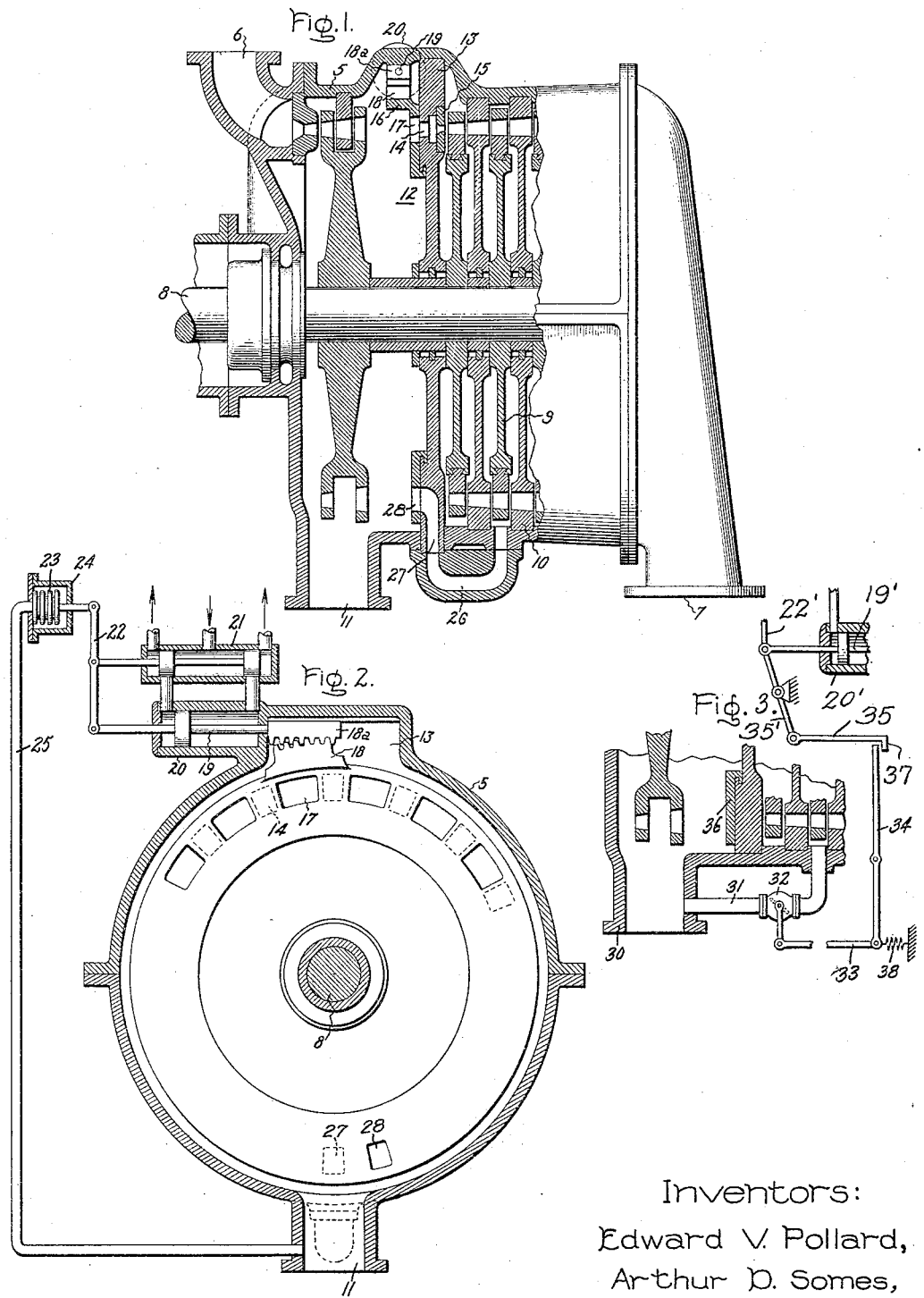

1,894,117

UNITED STATES PATENT OFFICE

EDWARD V. POLLARD, OF LYNN, AND ARTHUR D. SOMES, OF EAST LYNN, MASSACHU-
SETTS, ASSIGNORS TO GENERAL ELECTRIC COMPANY, A CORPORATION OF NEW
YORK

ELASTIC FLUID TURBINE

Application filed October 15, 1931. Serial No. 569,001.

The present invention relates to elastic fluid turbines, particularly to that kind of turbine which operates as a mixed pressure, extraction, or combined mixed pressure and extraction turbine. In such machines a conduit communicates with an intermediate stage of the turbine through which elastic fluid may be supplied to the turbine from any suitable external source, for instance from an accumulator, or through which elastic fluid may be extracted from the turbine for use external to the turbine.

It is well known in the turbine art to provide valve means such as a grid valve in the stage to which the conduit for supplying elastic fluid to the turbine or extracting elastic fluid therefrom is connected, in order to regulate the flow of elastic fluid through the turbine and to maintain substantially constant the pressure in said conduit.

The object of our invention is to provide a regulating mechanism for such turbine whereby the pressure in the conduit connected to the intermediate stage is maintained substantially constant at an increased range of flow of elastic fluid.

For a consideration of what we believe to be novel and our invention, attention is directed to the following description and the claims appended hereto together with the accompanying drawing which forms a part of the specification.

In the drawing, Fig. 1 illustrates partly in section an elastic-fluid turbine; Fig. 2 is a cross section through the intermediate stage of Fig. 1; and Fig. 3 shows a modification embodying our invention.

Referring to the drawing, 5 indicates the casing of an elastic-fluid turbine having an inlet conduit 6 and an exhaust conduit 7. 8 is the turbine shaft; 9 the bucket wheels fastened to the shaft. Secured to casing 5 and arranged between the bucket wheels are diaphragms 10 carrying nozzles for directing the elastic fluid in proper direction to the bucket wheels. 11 is a conduit, in the present instance shown as connected to the first stage through which elastic fluid may be supplied to the turbine or extracted therefrom. In order to maintain substantially constant pressure in conduit 11, we provide a valve means for controlling the flow of fluid through that part of the turbine beyond conduit 11, in the present instance shown as a grid valve 12, provided behind the first stage, and comprising a stationary member 13 having openings 14 on one side and a nozzle plate 15 on the other side. 16 designates a movable member which is provided with openings 17 which can be moved across the openings of the stationary member 13. The effective opening area formed by openings 14 and 17 of the stationary and movable grid valve members respectively can be altered by turning the movable member 16. For this purpose we provide the latter with a gear segment 18 meshing with a rack 18$^a$ which in turn is fastened to the stem 19 of a motor, in the present instance indicated as a fluid actuated motor 20. 21 is the pilot valve for the motor. 22 is a floating lever having one end connected to the stem of the fluid actuated motor and an intermediate point connecting to the pilot valve. The upper end of floating lever 22 is pivoted to a pressure-responsive device comprising a bellows 23 arranged within a casing 24. 25 is a pipe for connecting bellows 23 with conduit 11.

The mechanism so far described may be considered as typical for any arrangement for regulating the flow of elastic fluid through the conduit connected to an intermediate stage of a turbine. The operation is as follows: It is assumed that the turbine operates as an extraction turbine whereby elastic fluid is extracted from the turbine through conduit 11. If now the demand for elastic fluid extracted through conduit 11 decreases it will cause an increase of pressure in said conduit. The increased pressure causes through pipe 25 an expanding movement of bellows 23 and accordingly through the intermediary of the fluid actuated motor a turning of the movable member 16 of the grid valve in a direction to increase the opening area formed by openings 14 and 17 to permit an increased flow of fluid to the lower stages. The increased flow of fluid through the grid valve to the lower stages causes a decreased flow of fluid through the extraction conduit and accordingly a decrease of pressure in said conduit.

The mechanism for regulating the effective opening area of the grid valve has only been briefly described as being well known in the turbine art and as any other suitable valve means may be used for regulating the flow of fluid through the lower stages of the turbine.

It will be readily understood that the range of flow control of elastic fluid through conduit 11 is limited with respect to the opening area of the grid valve and the mechanical strength of the following lower stage, that is, a maximum amount of elastic fluid can be extracted through the extraction conduit when the grid valve is entirely closed and a minimum amount of fluid can be extracted when the grid valve is completely opened, that is, when openings 14 and 17 register.

In order to increase the range of flow control at the intermediate stage we provide according to our invention a by-pass for conveying elastic fluid from the intermediate stage to one of the lower stages, and means for regulating the amount of elastic fluid conveyed through the by-pass. In the present instance we have shown the by-pass 26 provided between the first stage and the third stage of the turbine. The by-pass comprises a passage 27 provided in the stationary member of the grid valve. The elastic fluid passed through passage 27 is controlled by opening 28 provided in the movable member of the grid valve. Opening 28 is so arranged with respect to the other openings in the movable member that it begins to register with passage 27 when the opening area formed by openings 14 and 17 of the grid valve has reached a maximum value.

The operation of our mechanism is as follows: Let us assume that the turbine shown in Fig. 1 operates as an extraction turbine. If under such conditions an increase of pressure in conduit 11 takes place owing to a decrease in demand for elastic fluid, it will cause through the pressure-responsive device and the motor 20 a turning of the movable member 16 of the grid valve in a direction to primarily increase the opening area formed by openings 14 and 17. When this opening area has reached a maximum value and a further increase in pressure in conduit 11 takes place owing to a further decreased demand for elastic fluid, it will cause a further turning movement of the movable member of the grid valve resulting in an opening of the by-pass 26, whereby elastic fluid is supplied from the extraction stage directly to one of the lower stages. This causes a decrease of pressure in conduits 11.

If now a decrease of pressure in conduit 11 takes place owing to an increased demand for elastic fluid, it will cause a collapsing of bellows 23 which effects through the fluid actuated motor a turning of the movable member of the grid valve, but now in an opposite direction, whereby the by-pass is gradually closed and thereafter the opening area formed by openings 14 and 17 gradually decreased until the desired pressure in conduit 11 is obtained.

From a consideration of Fig. 2, where we have shown the grid valve as being entirely closed, it will be seen that openings 17 of the movable member are considerably wider than the openings 14 of the stationary member. This permits a regulation of the opening area of the by-pass without affecting the maximum opening area formed by openings 14 and 17. Referring to Fig. 3, in which we have shown a modification according to our invention, 30 is a conduit corresponding to conduit 11 of Fig. 1 connected to an intermediate stage of a turbine. 31 designates a by-pass, in this instance provided between conduit 30 and a lower stage of the turbine. 32 is a regulating valve arranged in the by-pass controlling the amount of fluid conveyed therethrough. 33 and 34 indicate a lever mechanism for controlling valve 32, the latter being shown as a butterfly valve. The upper end of fulcrumed lever 34 is moved by a lever 35 having a hook 37 provided at its end. The lever 35 may be secured to the movable member 36 of the grid valve in such a manner that as soon as the maximum opening area of the grid valve is obtained, the hook 37 engages lever 34 and causes turning of butterfly valve 32. 38 is a spring means resisting opening of the butterfly valve. In the present instance we have shown a motor 20' including a piston 19' corresponding to motor 20 and piston 19 in Fig. 1 for controlling the movable member 36 of the grid valve. 22' is a lever corresponding to lever 22 in Fig. 2. Link 35 is connected to piston 19' of the motor by means of a fulcrumed lever 35'. With this arrangement link 35 and accordingly hook 37 and lever 34 are operated by the movable member of the grid valve, that is, through motor 20' which also serves for controlling the grid valve.

The operation of this mechanism is as follows: Let us assume that in this case the turbine operates as a mixed pressure turbine, that is, elastic fluid is supplied from an external source through conduit 30 to an intermediate stage of the turbine, whereby the pressure in the external source and accordingly the pressure in conduit 30 have to be maintained substantially constant, the regulating mechanism being in balanced position. If now, for instance the pressure in the external source increases it will cause a turning movement of the movable member of the grid valve in a direction to increase its opening area and to permit an increased amount of elastic fluid to be supplied to the turbine. As soon as the opening area of the grid valve has reached a maximum value and a further increase of pressure in conduit 30 takes place, it will cause a further turning movement of member 36 under action of motor 20' to the effect that hook 37 engages the upper end of lever 34 and thereby causes opening of butterfly valve 32. This allows elastic fluid to be supplied from conduit 30 through by-pass 31 to a lower stage of the turbine. The opening actuation of the butterfly valve continues until the pressure in conduit 30 has reached the desired value.

If now a decrease in pressure in conduit 30 takes place a turning movement of the movable member 36 by motor 20' will be initiated in a direction to effect closing of butterfly valve 32 by the action of the pressure spring 38 provided at the lower end of fulcrumed lever 34.

If valve 32 is entirely closed and a further decrease in pressure in conduit 30 takes place it will cause closing of the grid valve in the manner described above.

An important feature of our invention is that the control of the grid valve and the by-pass valve is definitely fixed by interlinking both valves. Thus no overlapping takes place, and the by-pass opens only after the grid valve has been fully opened or, in other words, after the movable member of the grid valve exceeds the limit of its range of flow control. Thereafter only the by-pass is opened to permit an increased range of flow control. With this arrangement the least possible amount of elastic fluid is by-passed and the efficiency of the turbine maintained.
Both valves are moved by a single motor which is controlled by a pressure responsive device connected to the conduit through which elastic fluid is extracted from or supplied to the turbine.
Having described our invention together with the apparatus which we now consider to represent the best embodiment thereof, we desire to have it understood that it is only illustrative and that the invention may be carried out by other means.

What we claim as new and desire to secure by Letters Patent of the United States is:

The combination with an elastic fluid turbine having a conduit connected to an intermediate stage through which elastic fluid may be extracted from or supplied to the turbine, of a grid valve provided at an intermediate stage for regulating the flow of fluid through the turbine, and a by-pass between the intermediate stage and a lower pressure stage through which elastic fluid can be passed to the lower stage, said grid valve comprising a stationary and a movable member provided with corresponding openings, one opening in each member forming a part of the by-pass and being so arranged with respect to the other openings that they begin to register when the opening area formed by the other openings has reached a maximum value.

In witness whereof, we have hereunto set our hands.

EDWARD V. POLLARD.
ARTHUR D. SOMES.